United States Patent [19]

Arpino

[11] 3,794,828

[45] Feb. 26, 1974

[54] ILLUMINATING LIGHT BLENDING MAKEUP MIRRORS AND ELECTRICAL CONTROL CIRCUIT

[75] Inventor: Ronald G. Arpino, Branford, Conn.

[73] Assignee: Sperry Rand Corporation, New York, N.Y.

[22] Filed: Mar. 15, 1972

[21] Appl. No.: 235,048

Related U.S. Application Data

[62] Division of Ser. No. 69,046, Sept. 3, 1970, abandoned.

[52] U.S. Cl. .......... 240/4.2, 307/38, 315/122

[51] Int. Cl. .......... F21v 33/00

[58] Field of Search 240/4.2; 307/262, 38; 315/194, 315/122

[56] References Cited

UNITED STATES PATENTS

| | | | |
|---|---|---|---|
| 3,478,222 | 11/1969 | Gassaway et al. | 307/38 |
| 3,355,982 | 12/1967 | Rendina | 315/122 X |
| 3,310,687 | 3/1967 | Howell | 315/194 X |
| 3,346,874 | 10/1967 | Howell | 307/262 X |
| 3,093,319 | 6/1963 | Gamain | 240/1.1 |
| 1,216,696 | 2/1917 | John | 240/4.2 X |
| 1,138,552 | 5/1915 | Goddard | 240/4.2 |

*Primary Examiner*—Robert P. Greiner

*Attorney, Agent, or Firm*—Charles R. Miranda; Donald P. Walker

[57] ABSTRACT

A plurality of incandescent lamps and one or more makeup mirrors are incorporated in a portable case. Some of the lamps are unfiltered, the others are provided with red filters. The red filtered lamps are all connected in parallel. The white lamps are also connected in parallel, and the two sets of parallel lamps are connected in series across a source of 110 volts alternating current. The high and common terminals of a bidirectional gate control thyristor are connected in parallel across the set of red lamps. A variable resistor and a capacitor are connected in series, and the RC circuit thus formed is connected in parallel across the set of red lamps. A triggering diode is connected between the gate terminal of the thyristor and the common terminal between the variable resistor and capacitor. The triggering diode is preferably incorporated into the same integrated circuit as the bidirectional gate control thyristor. The white incandescent lamps may be provided with light absorbing filters in order to balance the intensities of the two sets of lamps.

4 Claims, 8 Drawing Figures

ILLUMINATING LIGHT BLENDING MAKEUP MIRRORS AND ELECTRICAL CONTROL CIRCUIT

This is a division of application Ser. No. 69,046 filed Sept. 3, 1970, now abandoned.

SUMMARY OF THE INVENTION

This invention relates to illuminated light blending makeup mirrors and an electrical control circuit therefor. The electrical control circuit is applicable to other control systems where it is desired to increase the energy supplied to one load while decreasing the energy supplied to another load, and vice versa.

The light provided by artificial light sources does not have the same spectral characteristics as the "white" light provided by the sun. As a consequence of this, clothing, complexions, and ladies makeup appear of differing colors depending on whether they are illuminated with sunlight, fluorescent light, incandescent lamps, or the usually very reddish illumination provided in restaurants and night clubs. In recent years portable illuminated makeup mirrors have come into more widespread use. These are provided with one or more makeup mirrors, and an internal light source providing good illumination for makeup purposes. It is desirable that the spectral characteristics of the illumination provided be variable from white light corresponding as much as possible to natural daytime illumination to the more reddish illumination provided in restaurants and nightclubs.

Various circuits exist in the prior art for increasing the amount of power supplied to one load while decreasing the amount of power supplied to another load and vice versa. Unfortunately such prior art circuits require expensive ganged potentiometers; that is, two variable resistors mechanically connected together so that as the resistance of one is increased, that of the other is decreased. Furthermore, the additional circuitry which is employed in the prior art for proportioning two loads in quite complex and altogether too expensive to be employed in a high volume commercial product.

There are other applications wherein it is desired to provide such proportional control. One of these requiring proportional control between blue and yellow light sources is disclosed in U.S. Pat. No. 2,936,405 issued May 10, 1960 to D. W. Waner, entitled "Photographic Printing Method and Apparatus." The proportioning between the amount of yellow and blue light is required to control the contrast in printing black and white negatives onto variable contrast printing paper.

OBJECTS OF THE INVENTION

It is therefore an object of the invention to provide an electrical control circuit for proportioning the amount of power supplied to two electrical loads.

Another object of the invention is to provide a control circuit of the above character wherein said loads are incandescent lamps.

A further object of the invention is to provide a control circuit of the above character utilizing only a single potentiometer.

Still another object of the invention is to provide a control circuit of the above character employing a single integrated semiconductor switch.

A still further object of the invention is to provide a control circuit of the above character which is inexpensive to manufacture.

Still another object of the invention is to provide a control circuit of the above character for use in an illuminated makeup mirror.

Yet another object of the invention is to provide a self illuminated makeup mirror providing means for controlling the spectral characteristics of the illumination.

A yet further object of the invention is to provide an illuminated makeup mirror of the above character including a control circuit of the above character, that is simple, inexpensive to manufacture, utilizes standard parts, and is reliable.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claim.

For a fuller understanding of the nature and objects of the invention, reference should be had to the following detailed description taken in connection with the accompanying drawings in which:

The Drawings

The same reference characters refer to the same elements throughout the several views of the drawings.

DETAILED DESCRIPTION

Figures 1, 2, 3:
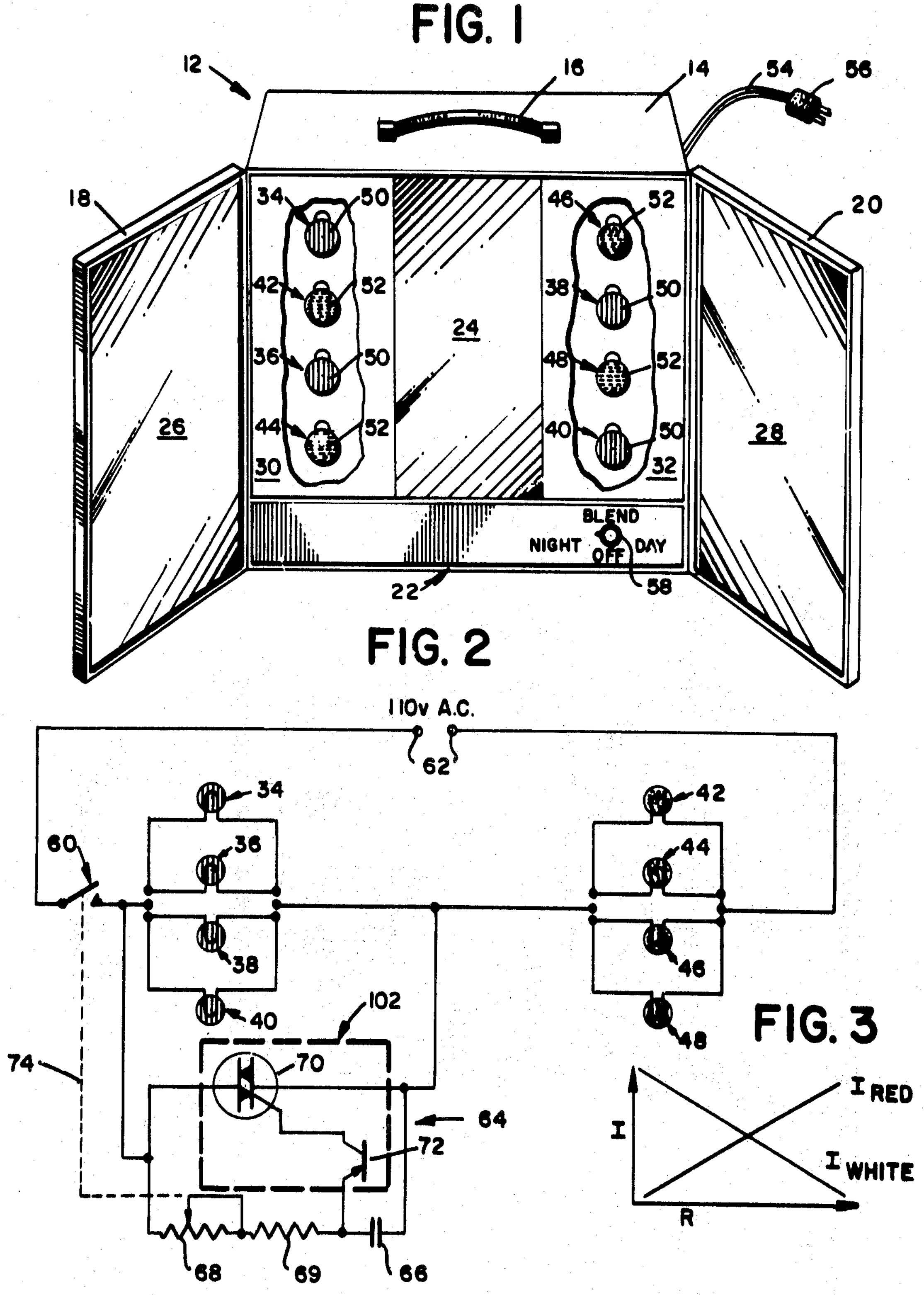
FIG. 1 is a perspective view of an illuminated makeup mirror appliance according to the invention.
FIG. 2 is an electrical circuit diagram of the electrical circuit employed in the appliance of FIG. 1.
FIG. 3 is a diagram of light intensity versus resistance, illustrating how the intensity of the two sets of light sources within the appliance of FIG. 1 may be infinitely proportioned by varying the variable resistance of FIG. 2.

An illuminated makeup mirror appliance, according to the invention, is generally indicated at 12 in FIG. 1. It comprises an outer case 14 and a handle 16 for carrying the appliance 12. A pair of doors 18 and 20, shown open in FIG. 1, may be closed to cover the face 22. Makeup mirrors 24, 26, and 28 are mounted in face 22 and on doors 18 and 20. A pair of translucent light diffusers 30 and 32, which may be of plastic or glass, are mounted in face 22 on opposite sides of mirror 24. Two sets of incandescent lamps comprising red lamps 34, 36, 38, and 40, and white lamps 42, 44, 46, and 48 are located behind diffusers 30 and 32. The lamps are preferably alternated as shown.

The red lamps 34 through 40 are provided with red filters 50 which may be painted or deposited directly upon the lamps. White lamps 42 through 48 may be provided with neutral gray density light absorbing filters 52 to balance the light output of the two sets of lamps.

The incandescent lamps are connected in circuit with line cord 54 provided with a plug 56 for connection to a source of 110 volts alternating current. The lamps are controlled by an integrated potentiometer and switch controlled by control knob 58 which when in the off position disconnects the lamps from the line cord 54. Knob 58 may also be placed in any position from "Night" through "Blend" to "Day" in controlling the potentiometer connected thereto.

The electrical circuit employed in the appliance 12 of FIG. 1 is shown in detail in FIG. 2. Switch 60 is connected in series with terminals 62 connected to a source of 110 volts alternating current through line cord 54 (FIG. 1). Red lamps 34, 36, 38, and 40 are connected in parallel with each other and in series with switch 60. White lamps 42, 44, 46, and 48 are connected in parallel with each other and in series with the set of red lamps 34 through 40. Thus, each set of lamps of the same color are connected in parallel to themselves and in series with the parallel connected second set.

A control circuit, generally indicated at 64, is connected in parallel across the red lamps 34 through 40. It comprises capacitor 66, potentiometer 68, and protective resistor 69, connected in series, a bidirectional gate control thyristor (Triac) 70 and a triggering diode (Diac) 72, connected as shown. The potentiometer 68 and switch 60 are preferably ganged together, as shown at 74. The effective resistance across the potentiometer 68 may be varied from zero to the maximum resistance provided. As this is done, the perceived intensities of the red and white incandescent lamps varies as indicated in FIG. 3. When the resistance 68 is zero, the white lamps provide maximum perceived illumination. As the resistance 68 is increased, the perceived illumination from the white lamps decreases and that from the red lamps increases until the red lamps are illuminated a maximum amount and the white lamps are illuminated the minimum amount.

This result is accomplished according to the invention by connecting switching circuit 64 across one bank of lamps only, as the impedence of one bank is chosen to be considerably smaller than the impedence of the other. When this is true, assuming that the switching circuit 64 is not operational, that is the resistance of resistor 60 is at its maximum, the red lamps are always connected in series with the white lamps. When the impedence (resistance) of the white lamps is very much less than the impedence (resistance) of the red lamps, nearly all of the voltage occurring at terminal 62 will appear across the high impedance red lamps according to the well-known Kirchhoff's Law. I have found that this phenomena occurs when equal numbers of lamps are employed, as shown in FIG. 2, if the wattage of the red lamps is approximately equal to or less than one third the wattage rating of the white lamps when both lamps are rated at the same voltage. The effect can be demonstrated by connecting a 10 watt light bulb in series with a 100 watt light bulb. Only the 10 watt light bulb will be illuminated.

If the illumination provided by the fully illuminated unfiltered white lamps is much greater than that provided by the filtered red lamps, neutral light absorbing filters 50 as shown in FIGS. 1 and 2 may be employed to balance the light output.

The Triac 70 is a controlled switch which may be caused to conduct at a predetermined time during each half cycle of the alternating voltage applied at terminal 62. This firing is controlled by the potentiometer 68. When the Triac 70 conducts, the red lamps are totally extinguished and the white lamps burn at maximum intensity.

Thus, according to the invention, when the control 58 is set at an intermediate position, the red lamps will be illuminated for approximately one quarter of an alternating current cycle at their maximum intensity and the white lamps will be hardly illuminated at all. Then, when Triac 70 conducts the red lamps will be extinguished and the white lamps will burn at maximum intensity.

Figure 4:
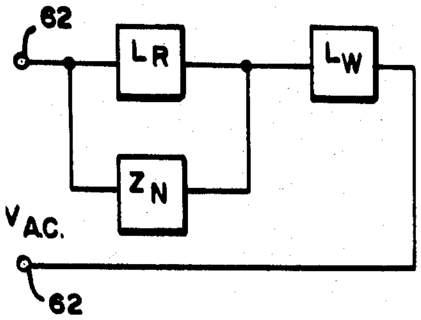
FIG. 4 is an electrical circuit diagram illustrating a principle of the invention.
Figure 5:
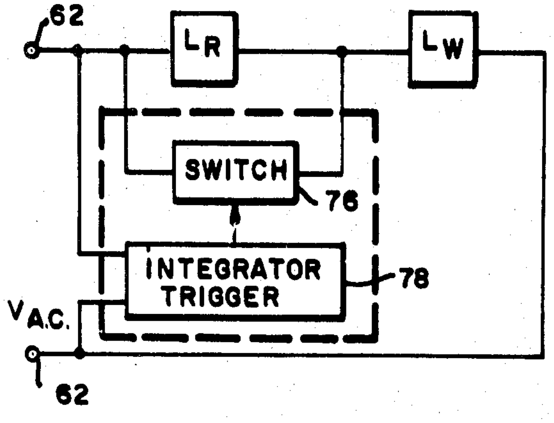
FIG. 5 is another electrical circuit diagram illustrating a principle of the invention.

Referring now to FIG. 4, in effect, the circuit of the invention comprises a load $L_R$ connected in series with load $L_W$ across alternating current terminals 62 and a nonlinear impedient $Z_N$ connected in parallel with load $L_R$. Nonlinear impedience $Z_N$ changes from open circuit to closed circuit during each half cycle of the alternating current applied at terminals 62. The impedience $Z_N$, as shown in FIG. 5, comprises a controlled switch 76 and an integrator trigger 78 controlling the same. The integrator trigger 78 integrates the potential across the load terminals 62 or, as shown in FIGS. 2 and 4, across the load $L_R$. After a predetermined portion of each half cycle, the trigger 78 closes the switch 76, shorting out the load $L_R$. Those skilled in the art will understand that the integrator trigger 78 could also be responsive to the potential across the load $L_W$. All that is necessary is that the waveform applied to the integrator trigger 78 be in phase with the waveform at terminals 62.

Figure 6:
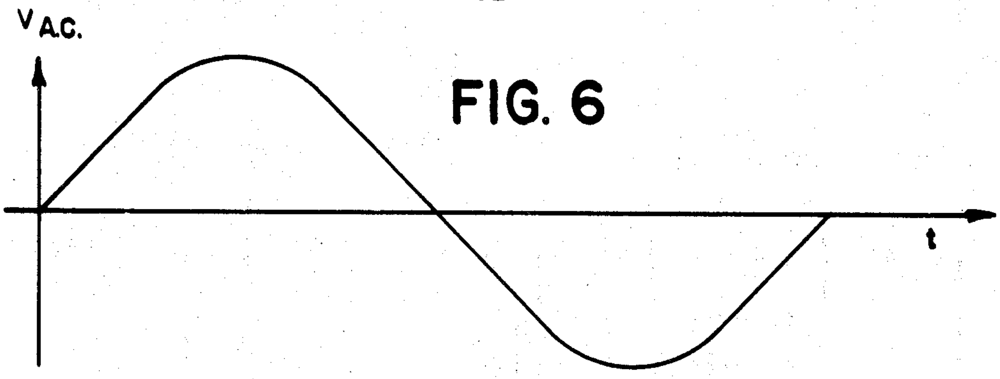
FIG. 6 is a diagram of potential versus time showing the alternating current waveforms occuring in the circuits of FIGS. 2, 4, and 5.
Figure 7:
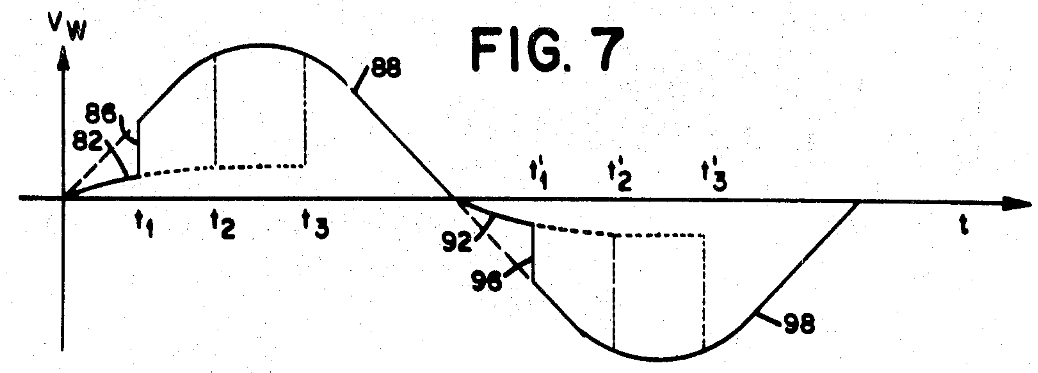
FIG. 7 is a diagram of potential versus time of the waveform occuring across one of the loads of the circuits of FIGS. 2, 4, and 5; and, FIG. 8 is a diagram of potential versus time showing the waveform occuring across the other of the loads of FIGS. 2, 4, and 5.
Figure 8:
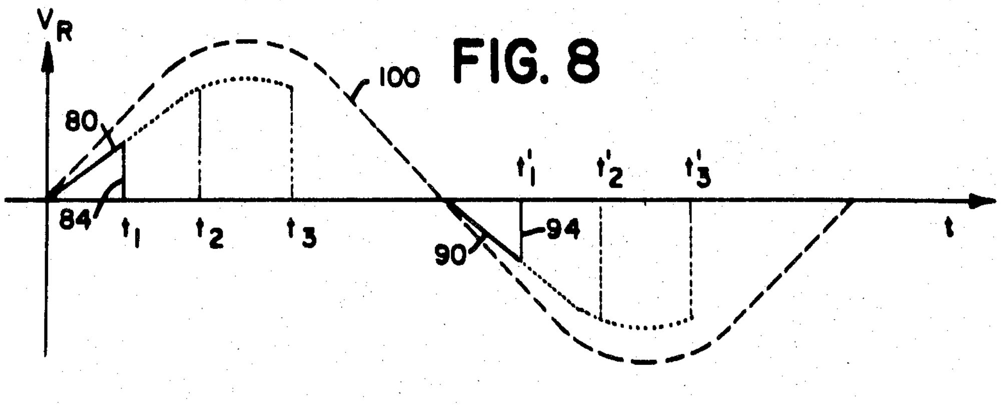

Further understanding of the invention may be had with reference to the waveform diagrams of FIGS. 6, 7 and 8. In FIG. 6, the alternating current potential $V_{AC}$ occurring at terminals 62 is shown as a function of time. In FIG. 7, the potential $V_W$ across the white lamps is shown; and in FIG. 8, the potential $V_R$ across the red lamps is shown.

Assume that the potentiometer at 68 is set at an intermediate position which requires a time $t_1$ for the capacitor 66 to charge through the effective resistance R of variable resistor 68 and protective fixed resistor 67 to the triggering potential of diode 72. When this potential is attained, Triac 70 is turned on.

Since initially the Triac 70 is turned off, nearly 100 percent of the rising potential is applied across the red lamps, as shown at 80 in FIG. 8. Only a very small portion is applied across the white lamps, as shown at 82 in FIG. 7, and actually their output may be imperceptible to the human eye. At time $t_1$, Diac 72 fires and Triac 70 becomes a short circuit. Thus, the voltage across the red lamps $V_R$ drops to zero, as shown at 84, FIG. 8, and the voltage applied across the white lamps rises to 100 percent of the applied voltage, as shown at 86 in FIG. 7. The white lamps continue to receive 100 percent of the alternating current waveform, as shown at 88 in FIG. 7, until the potential applied to the circuit is zero, at which time the reverse potential applied to the Triac 70 causes the same to become an open circuit again. Then the negative potential applied across the red lamps $V_R$ rises at nearly 100 percent of the negative potential applied to the circuit, as shown at 90 in FIG. 8, until time $t_1'$, which is equal to time $t_1$. The potential across the capacitor 66 then is equal to the breakdown potential of Diac 72 and causes Triac 70 to become a short circuit. The voltage across the red lamps then drops to zero, as shown at 94 in FIG. 8, and the voltage across the white lamps rises to 100 percent of the applied negative voltage, as shown at 96 in FIG. 7. 100 percent of the negative wave form is then applied to the white lamps, as shown at 98, in FIG. 7, until the phase of the potential again reverses. The process then repeats itself.

The waveform that would be applied across the red lamps if the white lamps were totally cut off is shown by the long dashed line 100 in FIG. 8.

If the resistance of potentiometer 68 is increased, the cut-off of the red lamps may be delayed until a time $t_2$ or a time $t_3$, for example, also as illustrated in FIGS. 7 and 8.

The circuit of FIG. 2, for example, may employ as the red lamps 34, 36, 38, and 40, four 15 watt, 110 volt appliance bulbs No. 15T7N, and four 40 watt 110 volt high intensity bulbs No. 40S11—N. The Triac 70 and Diac 72 are preferably incorporated in a single integrated circuit 102 of FIG. 2, sold under the trademark QUADRAC by Electronic Control Corporation, Euless, Texas. QUADRAC No. Q2001PT, manufactured by that company, may be employed with the previously mentioned bulbs, in which case potentiometer 68 is 250 kilohm rated at one half watt with integral switch and resistor 69 is 3,900 ohm, half watt resistor. Capacitor 66 is a 0.047 microfarad, 250 volt capacitor.

In another embodiment of the invention, four 25 watt appliance bulbs No. 25T8DC are connected in parallel as the white lamps and two 15 watt appliance bulbs No. 15T7DC are connected in parallel as the red bulbs. The other elements are the same.

Thus, I have provided an illuminated makeup mirror appliance with a single blend control for infinitely varying the proportions between light sources of two differing spectral characteristics. This has been accomplished with a single controlled semi-conductor switch 70, using standard incandescent lamps and electrical elements, and a single potentiometer.

Those skilled in the art will realize that other controlled switches and triggering devices could be employed in the invention — for example, silicon controlled rectifiers (SCRs) and zener diodes or neon bulbs. Furthermore, the circuit could be made responsive to only one half of the alternating current waveform by using an SCR and a shorting diode for the controlled switch. A further rectifying diode might then be employed so that the circuit will be energized with half wave alternating current.

It will be understood by those skilled in the electrical art that the control circuit disclosed herein can be used in other environments. For example, to control lamps of differing spectral characteristics in the printing of contact papers, as disclosed in the above United States patent. The circuit may also be employed to proportion the driving energy supplied to motors driving metering pumps, each connected to one of a pair of supply tanks of liquids to be dispensed in proportion, for example high and low octane gasolines. By setting the potentiometer 68, the proportion of the two liquids may be infinitely varied from all of one liquid to all of another liquid in the same manner as light is blended in the makeup mirror appliance disclosed herein.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. An appliance comprising:

a. a casing having a mirror connected thereto which is adapted for use as a makeup mirror, and an electrically energizable circuit connected to the casing and adapted to be electrically connected to a source of supply of A.C. power having an alternating current output voltage;

b. the circuit including first and second incandescent light sources electrically connected in a series combination with one another, the series combination being electrically connected across the source of A.C. power when the circuit is connected to the source, the light sources having the same voltage ratings but different wattage ratings, the wattage rating of the second light source being higher than that of the first light source;

c. the circuit also including non-linear impedance means electrically connected across said first light source and adapted to short-circuit said first light source a predetermined time interval during each half cycle of source output voltage, the non-linear impedance means including a bidirectional gate controlled thyristor electrically connected in parallel with said first light source and having electrically connected thereacross a variable resistor and capacitor electrically connected in series with one another, said thyristor having a gate terminal, said series connected variable resistor and capacitor having an electrically common connection therebetween, and the non-linear impedance means including a triggering diode electrically connected between the gate terminal of the thyristor and the common connection between the series connected variable resistor and capacitor;

d. a filter associated with at least one of said light sources and adapted to provide for the light from the respective sources to have different spectral characteristics; and e. means for manually varying the resistance of said variable resistor for varying said short-circuit time interval so as to increase the amount of power supplied to one of said light sources and decreases the amount of power supplied to the other of said light sources, whereby light contributed by each of said sources to the combined light from said sources may be suitably adjusted for use with said mirror as a makeup mirror.

2. The appliance according to claim 1, wherein each of said light sources includes a plurality of incandescent lamps respectively electrically connected in parallel with one another.

3. The appliance according to claim 1, wherein the wattage rating of said second light source is at least three times higher than the wattage rating of said first light source when measured at the same voltage level.

4. The appliance according to claim 1, wherein said filter is a red filter and is associated with one of said light sources whereby the light therefrom is red light, and the light from the other of said sources is white light.

* * * * *